UNITED STATES PATENT OFFICE.

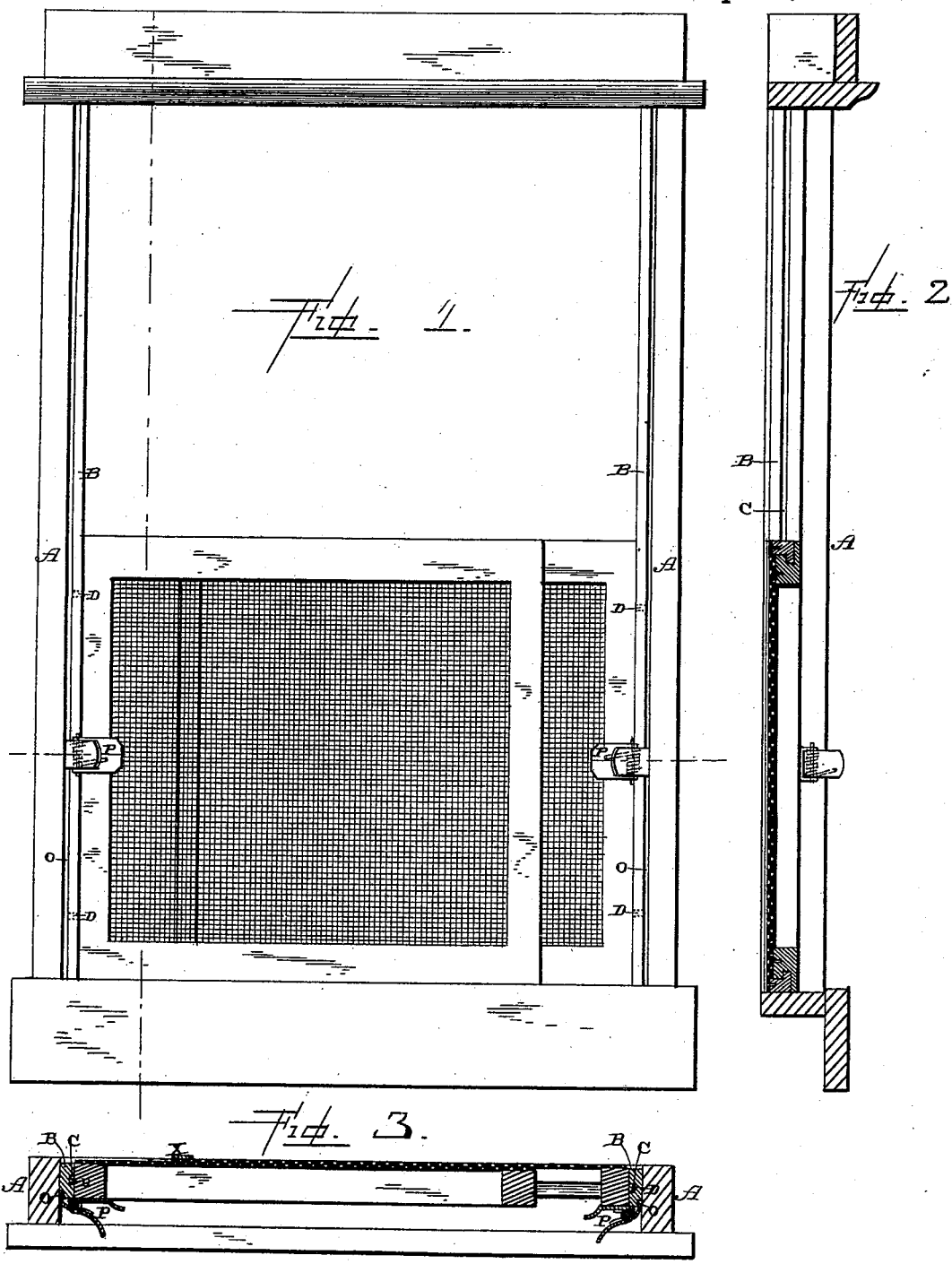

JAMES H. BURT AND SELVA E. HOLMAN, OF WEST RANDOLPH, VERMONT.

EXTENSION WINDOW-SCREEN.

SPECIFICATION forming part of Letters Patent No. 400,825, dated April 2, 1889.

Application filed August 15, 1887. Serial No. 246,970. (No model.)

*To all whom it may concern:*

Be it known that we, JAMES H. BURT and SELVA E. HOLMAN, citizens of the United States, residing at West Randolph, in the county of Orange and State of Vermont, have invented certain new and useful Improvements in Extension Window-Screens, of which the following is a specification, reference being had therein to the accompanying drawings.

Our invention relates to an improvement in window-screens; and it consists in the combination of the window-frame having vertically-grooved strips applied to opposite sides, with two screen-frames, each of which is provided with guiding pins or projections upon its outer end to catch in one of the grooves, and each frame provided with a spring-catch, which engages with the other grooves and holds the two screens in position, all of which will be more fully described hereinafter.

The object of our invention is to place the wire-netting of the two sliding screens in direct contact with each other, so as to prevent the passage of insects between the nets, to provide a smooth surface of netting next the sash to allow the free vertical movement of the screens, and to hold the screens in place on the window-frame by means of spring-actuated catches attached to the outside ends of the screens.

In the drawings, Figure 1 is a front elevation of a window-screen embodying our invention. Figs. 2 and 3 are sections taken through the window-frame and screens at right angles to each other.

A represents the window-frame, and secured to the inner sides of which are the two strips B, which extend from the top to the bottom of the frame, as shown. Both of these strips are provided with the grooves C in their inner sides, and in which grooves the guiding pins or projections D upon the outer ends of the screen-frames catch, for the purpose of holding the screen-frames in a vertical position at whatever height they may be raised, and causing them to always move in a line with the strips as they are adjusted up and down in the window-frame.

The two screen-frames are shaped as shown at their outer and lower edges, so as to interlock with each other, and to be guided in their movements as they are adjusted endwise in relation to each other, and one frame is made slightly wider than the other, so that the wire-netting of the two frames will be brought in direct contact with each other, as shown, and thus prevent insects from crawling between the screens, and thus get access into the house.

In order to prevent the edge of the netting of that frame which is open at one end from becoming frayed or injured, it is bound with metal, as shown at $x'$, and the two nettings come directly in contact with each other and slide freely back and forth without either becoming injured in any manner.

It will be noticed that the wire-nettings are so attached or tacked to the screen-frames that the side or face adjacent to the window-sash, against which they slide vertically, shall be perfectly smooth, so that the screen-frames may be closely adjusted to the window-sash and slide readily along its surface.

Secured to the outer end of each frame is a spring-actuated flat metallic clasp or catch, P, which have their outer ends to catch in the grooves O of the strips D with sufficient force to hold the screens in any position into which they may be adjusted, and yet allow for their free vertical movement. The springs force the outer ends of the catches against the sides of the grooves, thus holding the screens in a vertical position.

So constructed and arranged, the screens can be readily raised or lowered without touching the catches, the purpose of the catches being only to adjust the screens to the window and securely hold them in place at whatever point they may be raised or lowered. By simply forcing the catches backward at their inner ends their outer ends are raised out of the grooves in which they catch and slide, and the screen-frames can be removed from the window-frame. The pins or projections upon the ends of the frames serve to guide them vertically in their movements.

As the frames are extensible endwise upon each other, they can be adjusted to window-frames of any desired width.

Having thus described our invention, we claim—

1. The combination of the window-frame, the strips applied to the inner sides thereof, each one having a groove, C, in its inner side, and a groove, O, in its edge, the screen-frames provided with pins or projections to catch in the grooves C, and catches to catch in the grooves O, substantially as shown.

2. The combination of the window-frame, the strips B, secured to the inner sides thereof and provided with grooves C O, the expansible window-screen provided with pins or projections D, and the spring-catches P, consisting of stationary plates secured to the screen-frames, and spring-actuated plates pivoted upon the stationary plates, and having their outer ends bent so as to catch in the grooves O, substantially as described.

In testimony whereof we affix our signatures in presence of two witnesses.

JAMES H. BURT.
SELVA E. HOLMAN.

Witnesses:
CHARLES E. ALLEN,
G. D. WELLER.